United States Patent Office 3,007,843
Patented Nov. 7, 1961

3,007,843
NEMATOCIDE
Raymond W. Luckenbaugh, Wilmington, Del., assignor to E. I. du Pont de Nemours and Company, Wilmington, Del., a corporation of Delaware
No Drawing. Filed July 6, 1959, Ser. No. 824,903
3 Claims. (Cl. 167—22)

This invention relates to nematocidal compositions and methods employing certain bis(alkylthiocarbamoyl)sulfides.

It has been found that bis(alkylthiocarbamoyl)sulfides represented by the following formula have outstandingly effective nematocidal activity:

(1)
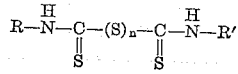

wherein R and R' can be the same or different and are lower alkyl groups containing less than 7 carbon atoms; and $n$ is a whole positive integer from 1 to 6.

Compounds of the above formula wherein $n$ is 1 can be made by the following reaction:

(2)
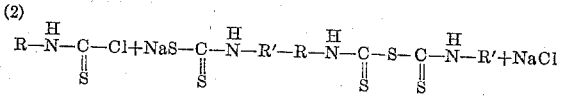

For the conditions of this reaction, see British Patent 653,436.

Symmetrical molecules of this type can also be made by reacting alkyl dithiocarbamic acid salts with oxidizing agents, such as persulfates, in the presence of an alkali metal cyanide (see British Patent 578,684), or with cyanogen chloride (see U.S. Patent 2,099,773 and U.S. Patent 2,706,205). These monosulfides can also be prepared from the alkyl dithiocarbamic acid salts by reaction with phosgene (see U.S. Patent 2,048,043).

Compounds represented by Formula 1 wherein $n$ is 2 can be prepared by reacting a salt of a monoalkyl dithiocarbamic acid with an oxidizing agent such as sodium persulfate. This reaction can be carried out in an aqueous medium at a temperature of about 0 to 35° C. using substantially molecular equivalent amounts of dithiocarbamate and persulfate.

Compounds in which $n$ is from 3 to 6 are prepared by reacting the corresponding alkyl dithiocarbamic acid salt with sulfur monochloride or sulfur trichloride (see U.S. 1,867,982 and U.S. 2,414,014). In most instances, mixtures of polysulfides are obtained by this process, which can either be used as such or separated into their components by recrystallization.

As aforementioned, the compounds represented by Formula 1 are outstandingly effective for the control of soil-borne nematodes. When mixed with the soil of agricultural plots infested with a wide variety of nematodes, including the rootknot nematode (Meloidogyne sp.), they give substantially complete control of these pests, thereby greatly increasing the crop productivity of the treated plots.

The present method for the control of soil-borne nematodes comprises mixing a compound of Formula 1 with soil infested with nematodes, said mixing being to a depth of at least two inches. This method is advantageously carried out by mixing with the soil the compound in the form of a nematocidal composition of the type hereinafter described.

In general, the nematocidal compositons are applied to cultivated land and mixed with the topsoil. The treatment must be conducted in a manner which will bring the nematocidal material into the habitat or environment of the nematode to be killed, and this is not accomplished merely by applying the material to the surface of the soil. Mixing to a depth of at least two inches is important.

In some instances the desired result can be accomplished by spraying or dusting the land with a nematocidal composition herein described and then promptly mixing the soil thoroughly to a depth of a least two inches, or preferably six to ten inches, with any of a number of widely available soil tillage tools.

A preferred method of application is to inject the bis (alkylthiocarbamoyl)sulfide beneath the surface of the soil through tubes extending at least two inches below the surface in operative relationship with some kind of plow. The active nematocidal ingredients, or their decomposition products in soil (which also have nematocidal activity), have a substantial vapor pressure, and when injected into soil in this manner act as soil fumigants. The vapor diffuses through the soil and thus mixes with it, killing the nematodes therein. It will be understood that such soil injection can advantageously be combined with seeding, the liquid nematocide being injected into a furrow at the time the seed is planted.

A dosage sufficient to exert nematocidal action is of course applied. Generally, from about 5 to 50 pounds per acre of the active ingredient is used to give satisfactory nematode control. The optimum dosage, of course, is largely determined by and dependent upon the particular soil to be treated, the method of application and the type of nematode infesting the area. In each case, the optimum dosage can be determined readily by those skilled in the art by conventional means.

Since these bis(alkylthiocarbamoyl)sulfides are relatively insoluble in water, they often are formulated into nematocidal compositions by extending them with a carrier material or conditioning agent of the kind used and commonly referred to in the art as a nematocide adjuvant or modifier. The conventional adjuvants are inert solids, hydrocarbon liquid diluents and surface-active agents. They provide compositions adapted for ready and efficient application using conventional applicator equipment. Usually from about 1 to 95% by weight of the nematocidal composition is active ingredient.

Solid compositions can be in the form of powders. They are compounded to be homogeneous powders that either can be used as such, diluted with inert solids to form dusts or suspended in a suitable liquid medium for spray application. The powders usually comprise the active ingredient admixed with minor amounts of conditioning agents. Natural clays and other powdered carriers such as attapulgite, china clay, diatomaceous earth, walnut shell flour, redwood flour, synthetic fine silica, calcium silicate and other inert solid carriers of the kind conventionally employed can be used. For conversion of the powders to dusts, talc, pyrophyllite, tobacco dust, volcanic ash and other dense, rapid settling, inert solids customarily are used. Preferably, such powder compositions are used promptly after being made.

Liquid compositions employing the active ingredient are prepared by admixing it with a suitable liquid diluent medium. Typical of the relatively non-herbicidal liquid media commonly employed are kerosene, Stoddard solvent, xylene, and alkylated naphthalenes; alcohols; and non-phytotoxic organic liquids such as cyclohexanone, glycols, diacetone alcohol, isoparaffins known as "Soltrols," "BR–140," etc.; butylacetate; and dimethylformamide. By "non-herbicidal" is meant that the liquid has such a low order of herbicidal action that it is not used commercially as a herbicide.

The active ingredient usually makes up from about 0.5 to 50% of these liquid compositions. Some of these compositions are designed to be used as such and others to be extended with large quantities of water.

Compositions in the form of wettable powders or liquids can advantageously include one or more surface-active agents such as wetting, dispersing or emulsifying agents. These materials cause the compositions to disperse or emulsify easily in water to give aqueous sprays, and also aid their penetration into and mixing with soils.

The surface-active agents employed can be of the anionic, cationic or nonionic type. They include, for example, sodium oleate, sulfonated petroleum oils, alkyl aryl sulfonates, sodium lauryl sulfate, polyethylene oxides, polyoxyethylene ethers and esters of fatty acid derivatives, lignin sulfonates, and other surface-active agents. A detailed list of such agents is set forth in an article by McCutcheon in "Soap and Chemical Specialties," volume 31, No. 7, pages 50–61; No. 8, pages 48–61; No. 9, pages 52–67; and No. 10, pages 48–67 (1955).

In order that the invention can be better understood, the following examples in addition to those set forth above are given:

*Example 1*

The following wettable powder nematocidal compositions are prepared by blending the active ingredient with the inert powder carrier, the wetting agent and the dispersant, and then grinding the mixture in an impact mill to an average particle size below about 50 microns, followed by reblending of the resultant powder until it is completely homogeneous.

A

| | Percent |
|---|---|
| Bis(methylthiocarbamoyl)disulfide | 75 |
| Sodium salt of alkylated naphthalene sulfonic acid | 1 |
| Low viscosity methyl cellulose | 0.25 |
| Purified white diatomaceous silica | 23.75 |

This composition, when extended at the rate of 25 pounds of the wettable powder in 100 gallons of water, is mixed at the rate of 10 pounds per acre with the soil in a plot infested with a variety of nematodes, including the rootknot nematode. This treatment gives good namatocidal control.

B

| | Percent |
|---|---|
| Bis(ethylthiocarbamoyl)monosulfide | 50 |
| Oleyl ester of sodium isethionate | 1.0 |
| Sodium lignosulfonate | 1.0 |
| Purified white china clay | 48.0 |

This composition, when extended with water and applied in the same way as powder composition A was extended and applied, gives excellent nematocidal control.

C

| | Percent |
|---|---|
| Bis(methylthiocarbamoyl)disulfide | 60 |
| Polyethylene oxide esters of mixed resin and fatty acids, concreted with urea | 2.0 |
| Anhydrous silica gel desiccant | 8.0 |
| Fine silica | 30 |

This composition, when extended with water at the rate of 35 pounds of the composition per 100 gallons of water and sprayed at the rate of 35 pounds per acre into furrows at least two inches deep in agricultural soil infested with nematodes, followed by turning soil into the furrows, gives excellent nematocidal action.

D

| | Percent |
|---|---|
| Bis(methylthiocarbamoyl)hexasulfide | 50 |
| Oleyl ester of sodium isethionate | 1.0 |
| Sodium lignosulfonate | 1.0 |
| Purified white china clay | 48.0 |

E

| | |
|---|---|
| Bis(propylthiocarbamoyl)hexasulfide | 60 |
| Polyethylene oxide esters of mixed resin and fatty acids, concreted with urea | 2.0 |
| Anhydrous silica gel desiccant | 8.0 |
| Fine silica | 30 |

Compositions D and E are extended with water and applied in the same way that composition A was extended and applied. Excellent nematocidal control is thereby obtained.

*Example 2*

The following dust compositions are prepared by blending the active ingredient and the minor diluent in a micropulverizer until a homogeneous mixture of these two materials is obtained, and then reblending with the major diluent until a homogeneous dust composition is obtained.

A

| | Percent |
|---|---|
| Bis(methylthiocarbamoyl)disulfide | 20 |
| Walnut shell flour | 20 |
| Tobacco dust | 60 |

B

| | |
|---|---|
| (Hexylthiocarbamoyl)(ethylthiocarbamoyl)trisulfide | 20 |
| Walnut shell flour | 20 |
| Tobacco dust | 60 |

C

| | |
|---|---|
| (n-Butylthiocarbamoyl)(isopropylthiocarbamoyl) pentasulfide | 20 |
| Walnut shell flour | 20 |
| Tobacco dust | 60 |

These dust compositions are applied at a rate of 150 pounds per acre using a conventional dust applicator to areas heavily infested with nematodes, including the rootknot nematode, and promptly mixed with the soil. This treatment gives effective nematode control.

*Example 3*

The following oil composition is prepared by mixing the ingredients, followed by ball milling for several hours until a homogeneous suspension of the active ingredient is obtained.

| | Percent |
|---|---|
| Bis(methylthiocarbamoyl)disulfide | 40 |
| Straight chain hydrocarbons such as kerosene | 55 |
| Polyethylene oxide ester of mixed fatty and resin acids | 5 |

This composition is suitable for extending either with water or oil.

Ten gallons of this composition are extended with 100 gallons of water, giving an emulsion that can be applied using conventional spray equipment. The resulting emulsion, when applied at the rate of 40 pounds per acre of the active ingredient, and mixed with the soil to a depth of six inches, gives excellent control of nematodes infesting the treated soil.

Another portion of this composition is extended with kerosene at the rate of 20 gallons of the composition in 100 gallons of kerosene. The resulting sprayable composition is then applied to a nematode infested area at the rate of 50 gallons per acre, giving excellent nematode control.

*Example 4*

The following emulsion composition is prepared by mixing the ingredients and passing the mixture through a homogenizer to give an emulsion.

| | Percent |
|---|---|
| (Hexylthiocarbamoyl)(methylthiocarbamoyl)tetrasulfide | 20 |
| Sulfonated petroleum oil | 5 |
| Straight chain hydrocarbons | 75 |

Fifteen gallons of this emulsion are then extended with 85 gallons of additional straight chain hydrocarbons, giving a formulation that is suitable for application using conventional spray equipment. When applied to a nematode infested area at the rate of 40 pounds of the active ingredient per acre and promptly mixed with the soil, excellent nematode control is obtained.

This application is a continuation in part of my co-pending, prior application Serial No. 649,296, filed March 29, 1957, now abandoned.

I claim:
1. The method for the control of soil-borne nematodes comprising mixing with the soil to be treated, to a depth of at least two inches and in nematocidally effective amount, a compound represented by the formula

$$R-\underset{\underset{S}{\|}}{\overset{H}{N}}-C-(S)_n-\underset{\underset{S}{\|}}{\overset{H}{C}}-N-R'$$

wherein R and R' can be the same or different and are lower alkyl groups containing less than 7 carbon atoms and $n$ is a whole positive integer from 1 to 6.

2. The method for the control of soil-borne nematodes comprising injecting into the soil to be treated, at a depth of at least two inches and in a nematocidally effective amount, a compound represented by the formula $$R-\underset{\underset{S}{\|}}{\overset{H}{N}}-C-(S)_n-\underset{\underset{S}{\|}}{\overset{H}{C}}-N-R'$$

wherein R and R' can be the same or different and are lower alkyl groups containing less than 7 carbon atoms and $n$ is a whole positive integer from 1 to 6.

3. The method for the control of soil-borne nematodes comprising mixing with the soil to be treated, to a depth of at least two inches and in the amount of about 5 to 50 pounds per acre, a compound represented by the formula $$R-\underset{\underset{S}{\|}}{\overset{H}{N}}-C-(S)_n-\underset{\underset{S}{\|}}{\overset{H}{C}}-N-R'$$

wherein R and R' can be the same or different and are lower alkyl groups containing less than 7 carbon atoms and $n$ is a whole integer from 1 to 6.

References Cited in the file of this patent

UNITED STATES PATENTS

| | | |
|---|---|---|
| 2,377,446 | Payne | June 5, 1945 |
| 2,419,073 | Hammer | Apr. 15, 1947 |
| 2,448,265 | Kagy | Aug. 31, 1948 |
| 2,473,984 | Bickerton | June 21, 1949 |
| 2,502,244 | Carter | Mar. 28, 1950 |
| 2,543,580 | Kay | Feb. 27, 1951 |
| 2,769,745 | Hardy | Nov. 6, 1951 |
| 2,695,859 | Hilmer | Nov. 30, 1954 |
| 2,701,224 | Stansbury | Feb. 1, 1955 |
| 2,779,680 | Wolf | Jan. 29, 1957 |
| 2,794,727 | Barrons | June 4, 1957 |
| 2,809,983 | Heininger | Oct. 15, 1957 |

FOREIGN PATENTS

| | | |
|---|---|---|
| 8,103/32 | Australia | July 4, 1932 |